Patented May 26, 1953

2,640,087

UNITED STATES PATENT OFFICE 2,640,087

MANUFACTURE OF LATEX FOAM SPONGE

Robert O. Borton, Mishawaka, Ind., assignor to United States Rubber Company, New York, N. Y., a corporation of New Jersey No Drawing. Application May 10, 1950, Serial No. 161,272

4 Claims. (Cl. 260—723)

1

This invention relates to improving the structure and physical properties of sponge rubber made from whipped latex foam.

Sponge rubber made by conventionally whipping latex containing soap into a foam or froth and gelling the whipped foam or froth with alkali-metal silicofluoride has a non-uniform structure in which a relatively small number of large cells that are clearly visible to the naked eye are interspersed irregularly throughout a network of a large number of smaller cells that are not visible to the naked eye but which may be seen under low power (e. g. four times) magnification as being very non-uniform in size and having thin and easily ruptured walls. Many fissures are noticeable under low power magnification in the connecting walls of the small cells. The large cells in the sponge are presumably formed by the uncontrolled collapse of the fluid walls of a number of adjacent bubbles of the foam, or the complete local collapse of the soap phase at various parts before gelling takes place.

I have found that the incorporation of a definite small amount of alkali-metal silicate, e. g. sodium silicate, in a latex foam containing soap to be gelled with a definite amount of alkali-metal silicofluoride, e. g. sodium silicofluoride, will result in a sponge rubber with uniform-sized spherical cells clearly visible to the naked eye that have relatively thick walls which are substantially free from fissures and which are relatively difficultly ruptured. Such sponge rubber products have a greater tensile strength and higher modulus than sponge rubber products of the same density made without the sodium silicate. The sodium silicate permits lengthening of the gelling period, as does other alkaline stabilizing agents, such as alkali-metal hydroxide or alkali-metal hydroxide and sodium metaphosphate, but it is only sodium silicate, as in the present invention, that at the same time consistently controls the collapse of the soap phase before gelling so that from the fine bubble structure of the wet whipped foam there results a sponge rubber having a uniform structure of spherical cells that are larger than the bubbles in the whipped foam and are uniform and clearly visible to the naked eye. Other alkaline stabilizing agents may rarely produce a comparable result, but not consistently enough to be of any practical value.

In carrying out the present invention, there is incorporated in the latex containing conventional compounding and curing ingredients

2 alkali-metal silicate within the range of 0.2 to 1.8 parts, and preferably 0.8 to 1.5 parts, per 100 parts of solids of the latex. All parts and percentages referred to herein are by weight. The latex should contain 1 to 5 parts of alkali soap or soap-forming monocarboxylic acid for whipping the latex up to the desired foam density. The term "alkali soap" is conventionally used herein as the generic term which includes alkali-metal (sodium and potassium) and ammonium soaps, and is further used in its commonly accepted sense as exclusive of the alkali-earth and other polyvalent-metal water-insoluble soaps. Such alkali soaps are commonly referred to as water-soluble soaps. The soap-forming acids of such water-soluble soaps may be abietic (rosin) acids or aliphatic (fatty) acids having 8 to 24 carbon atoms in the molecule, or mixtures thereof as in tall oil acids. The latex containing the alkali soap and alkali-metal silicate, and conventional compounding ingredients such as accelerator and 1 to 5 parts of zinc oxide and 1 to 5 parts of sulfur per 100 parts of latex solids, is whipped into a foam of the desired density, and 0.5 to 4 parts of alkali-metal silicofluoride per 100 parts of latex solids is added to the foam after which the foam is shaped, as by pouring into molds or on a belt or in a tray, and the shaped foam is allowed to gel at room or elevated temperature, followed by conventional curing. The cells of the gelled foam or wet sponge are uniform and larger than the cells of the whipped ungelled foam by virtue of the controlled uniform partial collapse of the wet cell walls of the foam throughout the mass before gelling takes place. The alkali-metal silicate is in amount less than the alkali-metal silicofluoride, in addition to these two materials being in the ranges above referred.

The latex may be all natural rubber latex or may be a mixture of natural rubber latex and synthetic rubber latex in which mixture the natural rubber latex is in a major proportion, that is, the solids content of such mixture is over 50% natural rubber solids, and the synthetic rubber latex is in minor proportion, that is, less than 50% of the solid content of such mixture is synthetic rubber. Such synthetic rubber latex may be an aqueous emulsion polymerizate of various butadiene-1,3 hydrocarbons, for example, butadiene-1,3, isoprene, piperylene, 2,3-dimethylbutadiene-1,3, or of mixtures thereof, or of mixtures of one or more such butadiene-1,3 hydrocarbons with one or more other polymerizable compounds which are capable of forming rubbery compounds with butadiene-1,3 hydrocarbons, for example, up to 70% of such mixtures of compounds which contain a $CH_2=C<$ group where at least one of the disconnected valencies is attached to an electroactive group, that is, a group which substantially increases the electrical dissymmetry or polar character of the molecule. Examples of compounds which contain a $CH_2=C<$ group and are copolymerizable with butadiene-1,3 hydrocarbons are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide, isobutylene, methyl vinyl ether, methyl vinyl ketone, vinylidene chloride. In practice, the synthetic rubber latex used with natural rubber latex in the present invention is the government synthetic rubber latex or GR-S latex which is a latex of a copolymer of a major proportion of butadiene and a minor proportion of styrene.

The following examples illustrate the invention:

*Example I*

To a commercial concentrated natural Hevea rubber latex having 62.5% total solids concentration and containing free ammonia as a preservative, was added a small amount of formaldehyde to reduce the ammonia content to 0.25% on the latex. The latex was compounded according to the following dry weight formulation: 100 parts of rubber, 2 parts of potassium oleate, 2.3 parts of zinc diethyl dithiocarbamate accelerator, 2.5 parts of sulfur, 5 parts of zinc oxide, and 1.37 parts of sodium silicate. The water-soluble soap and sodium silicate were added to the latex as solutions and the other ingredients were added as conventional aqueous pastes. The latex was whipped into a foam in the conventional manner and 3.5 parts of sodium silicofluoride was added to the foam in the form of an aqueous paste and uniformly mixed therein. The latex foam was then poured into molds, allowed to gel, vulcanized by heating, and was then removed from the molds, washed and dried. Foams of different densities were made, and foams of similar densities were made according to the same procedure but without the sodium silicate.

The sponges made from the latex to which the sodium silicate had been added all had a uniform structure clearly showing in a cut section a network of spherical cells uniform in size and clearly visible to the naked eye. Observation under a low power magnification (4 times) readily confirmed the great uniformity of cell size of spherical shape, and showed freedom from fissures in the cell walls. Four times magnification also showed a multiplicity of fine perforations in the cell walls. The sponges made from the latex to which no sodium silicate had been added all showed the conventional structure of whipped foam sponge, i. e., a small number of large cells scattered here and there irregularly over the cut surface obviously made from collapse of large bubbles, but the cell structure of most of the cut surface was not visible to the naked eye. Under four times magnification, the structure of that portion of the cut surface other than the visible large cells, was seen to be composed of small cells of non-uniform size with many fissures in the cell walls, and also with the conventional multiplicity of fine perforations in the cell walls.

Sponges, made with and without the sodium silicate addition to the latex, of different densities were tested for tensile strength and compression deflection according to the approved methods set up by ASTM (American Society of Testing Materials) and RMA (Rubber Manufacturers Association) specifications. For tensile strength measurements, cylindrical die-cut plugs one and five-eighths inches in diameter are cemented at the ends to plywood squares and pulled on a Scott Tensile machine. Results are given in pounds per square inch of cross-sectional sample area. For compression-deflection measurements, a micrometer testing bead is turned down on a similar one and five-eighths inches diameter die-cut plug until the specimen is under 25% deflection. Results are reported in pounds per square inch of cross-sectional sample to obtain the 25% deflection. The sponges made with the sodium silicate additions to the latex showed higher tensile strengths and higher compression deflections than those made without the sodium silicate additions at the same densities as shown by the following:

With sponges of the same density viz. 0.0036 lbs./cubic in., the tensile strength and compression deflection of sponge without the sodium silicate addition was 12.8 and 0.35 lbs./sq. in. respectively, and with the sodium silicate addition was 17.7 and 0.41 lbs./sq. in., respectively.

With the sodium silicate addition, tensile and compression deflection of 27.1 and 1.27 lbs./sq. in. respectively were obtained with a sponge of 0.0057 lbs./cubic in. density, whereas without the sodium silicate, such tensile and compression deflection values were not reached until a sponge of 0.0069 lbs./cubic in. density was tested.

*Example II*

To 40 parts (dry weight) of a 60% solids GR-S latex was added 0.06 part of potassium oleate, 0.25 part of sulfur, and 0.2 part of zinc diethyl dithiocarbamate, and the latex was heated at 118° F. for 36 hours to mature the same. The GR-S latex was a conventional latex, the synthetic rubber particles of which contained a major proportion of butadiene-1,3 and a minor proportion of styrene. The 40 parts (dry weight) of the thus treated GR-S latex was mixed with 60 parts (dry weight) of commercial concentrated natural rubber latex of 66% solids concentration. The mixture of latices 100 parts dry weight was compounded according to the following dry weight formulation:

0.5 part of sodium hexametaphosphate
1 part of potassium castor oil soap
1 part of triethyl trimethyl triamine accelerator (which also acts to pre-sensitize the latex)
0.5 part of reaction product diphenylamine and acetone (antioxidant)
1.5 parts of zinc diethyl dithiocarbamate (accelerator)
2.3 parts of sulfur
3.0 parts of zinc oxide
1 part of sodium silicate The compounding ingredients were added as conventional solutions or aqueous pastes. The latex was whipped into a foam in the conventional manner and 3 parts of sodium silicofluoride as an aqueous paste was added to the foam and uniformly mixed therein. A similar foam was prepared without the sodium silicate. The latex foams were poured into molds, allowed to gel, vulcanized by heating, and removed from the molds, washed and dried.

At approximately the same densities (0.0031 lbs./cu. in. for the sponge without the sodium silicate and 0.0038 lbs./cu. in. for the sponge with the sodium silicate), tensile strengths and compression deflection measurements were respectively 4.5 and 0.18 lbs./sq. in. for the sponge without the sodium silicate, and were respectively 10.3 and 0.452 lbs./sq. in. for the sponge with the sodium silicate.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of making sponge rubber which comprises preparing a fluid foam of a rubber latex selected from the group consisting of natural rubber latex and mixtures of a major proportion of a natural rubber latex and a minor proportion of a synthetic rubber latex which is an aqueous emulsion polymerizate of material selected from the group consisting of butadiene-1,3 hydrocarbons and mixtures of butadiene-1,3 hydrocarbons with other polymerizable compounds containing a $CH_2=C<$ group and capable of forming copolymers with butadiene-1,3 hydrocarbons, said latex containing 1 to 5 parts of water-soluble soap of soap-forming monocarboxylic acid and 0.2 to 1.8 parts of alkali-metal silicate, and adding to the thus prepared foam 0.5 to 4 parts of alkali-metal silicofluoride per 100 parts of latex solids, the said alkali-metal silicate being in amount less than the said alkali-metal silicofluoride, shaping the foam before gelling takes place, permitting the foam to gel, and vulcanizing to form sponge rubber.

2. The method of making sponge rubber which comprises preparing a fluid foam of a rubber latex selected from the group consisting of natural rubber latex and mixtures of a major proportion of a natural rubber latex and a minor proportion of a synthetic rubber latex which is an aqueous emulsion polymerizate of material selected from the group consisting of butadiene-1,3 hydrocarbons and mixtures of butadiene-1,3 hydrocarbons with other polymerizable compounds containing a $CH_2=C<$ group and capable of forming copolymers with butadiene-1,3 hydrocarbons, said latex containing 1 to 5 parts of alkali-metal soap of soap-forming monocarboxylic acid and 0.2 to 1.8 parts of alkali-metal silicate, and adding to the thus prepared foam 0.5 to 4 parts of alkali-metal silicofluoride per 100 parts of latex solids, the said alkali-metal silicate being in amount less than the said alkali-metal silicofluoride, shaping the foam before gelling takes place, permitting the foam to gel, and vulcanizing to form sponge rubber.

3. The method of making sponge rubber which comprises preparing a fluid foam of a natural rubber latex compound containing 1 to 5 parts of water soluble soap of soap-forming monocarboxylic acid and 0.2 to 1.8 parts of alkali-metal silicate, and adding to the thus prepared foam 0.5 to 4 parts of alkali-metal silicofluoride per 100 parts of latex solids, the said alkali-metal silicate being in amount less than the said alkali-metal silicofluoride, shaping the foam before gelling takes place, permitting the foam to gel, and vulcanizing to form sponge rubber.

4. The method of making sponge rubber which comprises preparing a fluid foam of a natural rubber latex compound containing 1 to 5 parts of alkali-metal soap of soap-forming monocarboxylic acid and 0.2 to 1.8 parts of alkali-metal silicate, and adding to the thus prepared foam 0.5 to 4 parts of alkali-metal silicofluoride per 100 parts of latex solids, the said alkali-metal silicate being in amount less than the said alkali-metal silicofluoride, shaping the foam before gelling takes place, permitting the foam to gel, and vulcanizing to form sponge rubber.

ROBERT O. BORTON.

References Cited in the file of this patent

UNITED STATES PATENTS

| Number | Name | Date |
|---|---|---|
| 2,321,111 | Stamberger | June 8, 1943 |
| 2,469,894 | Rogers | May 10, 1949 |
| 2,567,952 | Lewis | Sept. 18, 1951 |

FOREIGN PATENTS

| Number | Country | Date |
|---|---|---|
| 574,131 | Great Britain | Dec. 21, 1945 |